INVENTORS
Anita G. Sundin
Benjamin Caplan
BY
Herbert C. [signature]
ATTORNEY

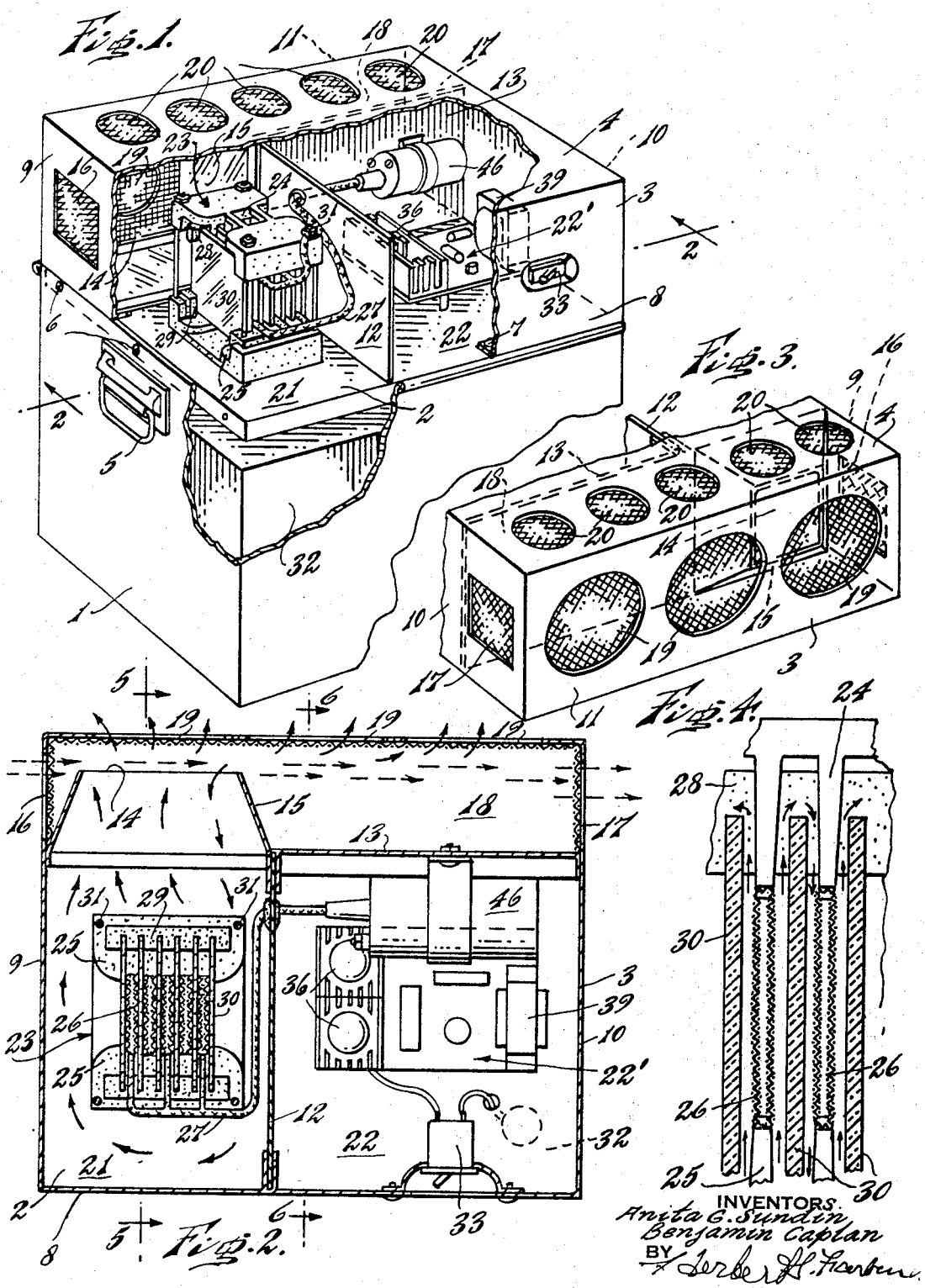

INVENTOR
Anita G. Sundin,
Benjamin Caplan
BY
ATTORNEY

United States Patent Office 3,421,836
Patented Jan. 14, 1969

3,421,836
METHOD OF AND APPARATUS FOR OZONIZING AIR CIRCULATING IN A CONFINED REFRIGERATED SPACE
Anita G. Sundin, Philadelphia, Pa., and Benjamin Caplan, 5519 Walnut St., Philadelphia, Pa. 19139; said Sundin assignor to said Caplan
Filed July 3, 1964, Ser. No. 380,143
U.S. Cl. 21—53     2 Claims
Int. Cl. F24f 3/16; A611 13/06

ABSTRACT OF THE DISCLOSURE

A method of and apparatus for maintaining a continuous circulation of ozonized air in a confined refrigerated space. The apparatus includes a venturi passage as the discharge opening for the ozone generator, across which is blown the air being circulated in the confined space thereby enabling a continuous supply of ozone to be discharged to the circulating air stream.

---

The primary object of this invention is to devise a new and novel method of an apparatus for treating perishables; organic and animal, in such a manner as to extend the life and control the ripening process of fruits and vegetables, while being shipped, either in trucks, box cars or any type of vehicle, refrigerated or otherwise.

A further object is to prevent shrinkage, and seal the outer surfaces of said products, thus reducing or preventing shrinkage, dehydration, or reduction of weight loss while being transported.

A further object is to keep the air pure and fresh and free from germs and bacteria, thus eliminating mold, bacteria, fungi and odors while the product is in transit or in storage.

A further object is to keep the contamination on any fruit or vegetable from spreading through an entire package while the product is being shipped.

A further object is to enhance the appearance, eye appeal, natural bloom, flavor and taste of any fruit or vegetable for a much longer period of time.

A further object is to treat the walls of refrigerated vehicles so as to render them germ free and destroy any mold formation.

A further object is to keep shipping containers, whether they are cardboard, wood, or synthetic, free from any mold, or bacteria formation and to keep them free from odors and prevent any contamination, while the product is being shipped.

With the foregoing and other objects in view as will hereinafter more clearly appear, our invention comprehends a method of and apparatus for ozoning air circulating in a confined space.

It further comprehends a novel construction and apparatus of an ozone generator and an electric circuit therefor, and a novel construction and arrangement of a container for receiving the component parts and for causing the air to pass over the discharge end of a venturi leading from the chamber in which the ozone is generated.

For the purpose of illustrating the invention, we have shown in the accompanying drawings preferred embodiments of which we have found in practice to give satisfactory and reliable results. It is, however, to be understood that the various instrumentalities of which our invention consists can be variously arranged and organized, and the invention is not limited except by the scope of the appended claims, to the exact arrangement and organization of these instrumentalities as herein set forth.

FIGURE 1 is a perspective view, partly broken away, of an ozone generating apparatus embodying our invention.

FIGURE 2 is a section on line 2—2 of FIGURE 1.

FIGURE 3 is a perspective view, partly broken away, of a rear view of the upper portion of FIGURE 1.

FIGURE 4 is a fragmentary vertical section, on an enlarged scale, of the wire grids and dielectric separators, taken on line 4—4 of FIGURE 5.

Similar numerals of reference indicate corresponding parts.

Figure 5:
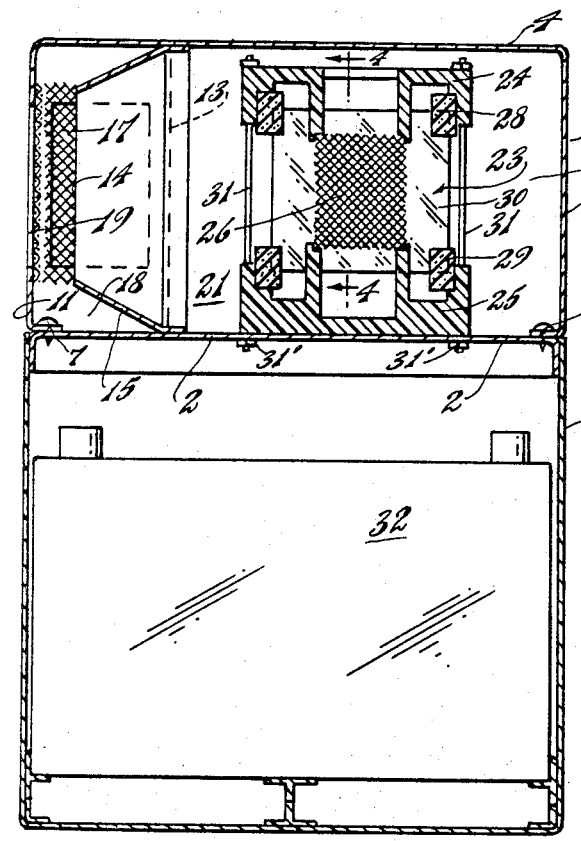
FIGURE 5 is a transverse section on line 5—5 of FIGURE 2.
Figure 6:
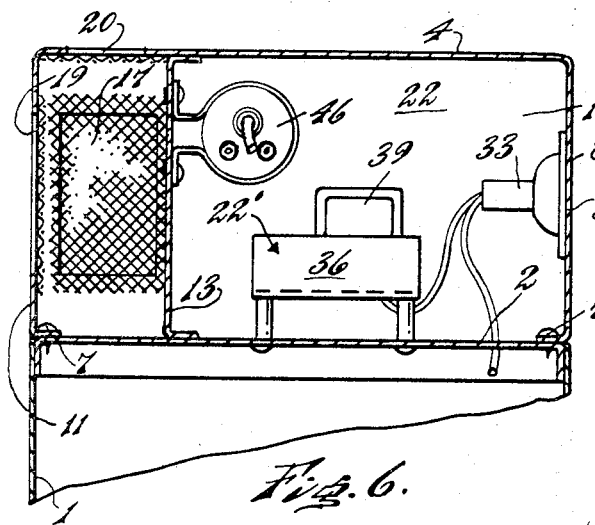
FIGURE 6 is a transverse section on line 6—6 of FIGURE 2.
Figure 7:
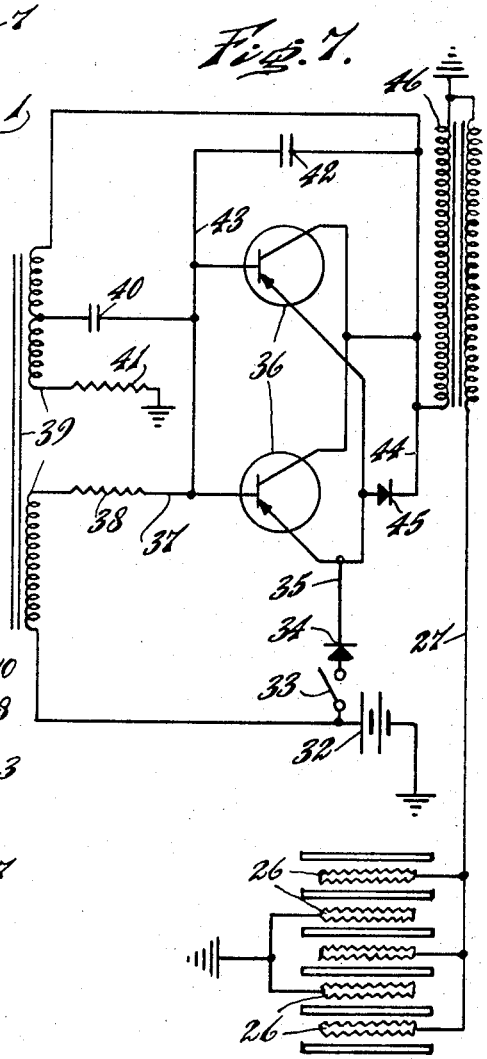
FIGURE 7 is a wiring diagram common to both forms of the invention.

Referring to the drawings:

The apparatus has a lower casing 1, forming a battery compartment, having a closed top 2, which forms a shelf on which is mounted an upper container 3, the upper end of which is closed by a top 4. The lower casing 1 is also provided with grasping handles 5, only one of which is shown, to enable the entire unit to be placed at a desired location within a vehicle. The shelf 2 is fixed to the end walls of casing 1, at its upper portion by metal cutting screws 6, the upper container 3, also being fixed thereto by fastening means 7. The containers are preferably rectangular and the upper container 3 is provided with a front wall 8, side walls 9 and 10 and rear wall 11. The container 3 is also divided by a transverse wall 12 and a longitudinal wall 13, which terminates in a funnel shaped opening 14, which forms a venturi 15. The side walls 9 and 10 are provided with air openings 16 and 17 which provide a passage for the air which is normally being circulated by any means desired within the confined space of the vehicle, the apparatus being so positioned that the opening of the venturi 15 will receive the most efficient flow of circulated air across its mouth, the longitudinal wall 13 and the rear wall 11 forming a passage 18 for said circulated air, said passage 18 also being provided with discharge openings 19 in the rear wall 11 and discharge openings 20 in the top 2, all said openings shown as being protected by screens. The transverse wall 12 and the longitudinal wall 13 combine to form a chamber 21 in which an ozone generator, later to be described, is mounted, and a chamber 22 in which the electrical components 22′ are mounted. The ozone generator 23 consists of upper and lower mountings 24 and 25, which may be of any desired insulating material, such as plastic, and may be resilient if desired, and are adapted to receive and retain grids 26 in spaced relation, said grids being connected in a suitable manner to a conductor 27. The mountings 24 and 25 are also adapted to receive resilient insulating blocks 28 and 29, which are preferably formed from silicone rubber and which are adapted to receive dielectric separators 30, which are shown as glass, but may be of any desired insulating material. The mountings 24 and 25 are arranged in spaced relationship in such a way as to permit the free flow of air around the dielectric separators 30 to prevent arcing of current under certain atmospheric conditions, and is best shown in FIGURE 4. The ozone generator is maintained in assembled relation by means of studs 31, which in turn are mounted on the shelf 2 in chamber 21 and are retained in position by nuts 31′.

The electric circuit

The battery 32, mounted in the casing 1, has its negative terminal grounded to the casing, the positive current passing through switch 33 to selenium diode 34, the diode 34 restricting the flow of current from positive to negative only. Conductor 35 connects to transistor 36, then through conductor 37, through resistor 38 to transformer 39, then through capacitors 40 and 42 through conductor 43, back to transistor 36, thus forming a feed back circuit. Transformer 39 is grounded through resistor 41. Ignition type coil 46 is fed by conductor 44 from transistor 36, having one end grounded. Circuit is protected by Zener diode 45 which prevents peak voltages in excess of the transistor capacity. From high voltage side of ignition coil, ozone generator 23 is fed through conductor 27.

This circuit is constructed so that a very small current draw from the battery, approximately one ampere is effected, but still permitting a high voltage, high frequency output, approximately 4000 volts, 800 to 900 cycles per second. This would increase the utility of the device for relatively long periods, as freight shipments of meats and produce could take seven or eight days to go from one coast to the other. With the use of this circuit the entire battery operated, self-contained portable ozone generator's weight could be kept to a minimum, because smaller weight and capacity batteries could be used.

Figure 8:
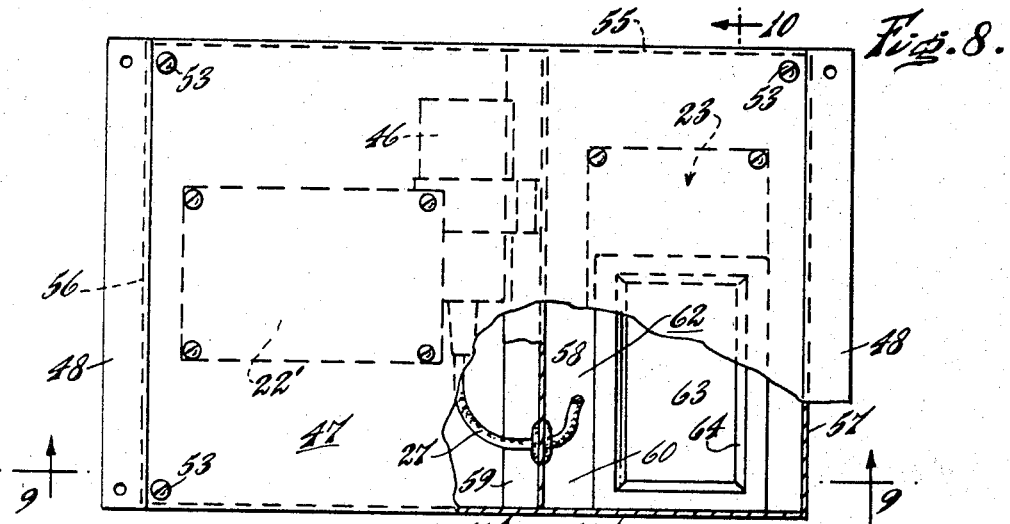
FIGURE 8 is a top plan view, partly broken away, of a modified form of the invention, wherein the apparatus is designed for mounting on the ceiling of a refrigerated truck and utilizing the truck battery for a source of power.
Figure 9:
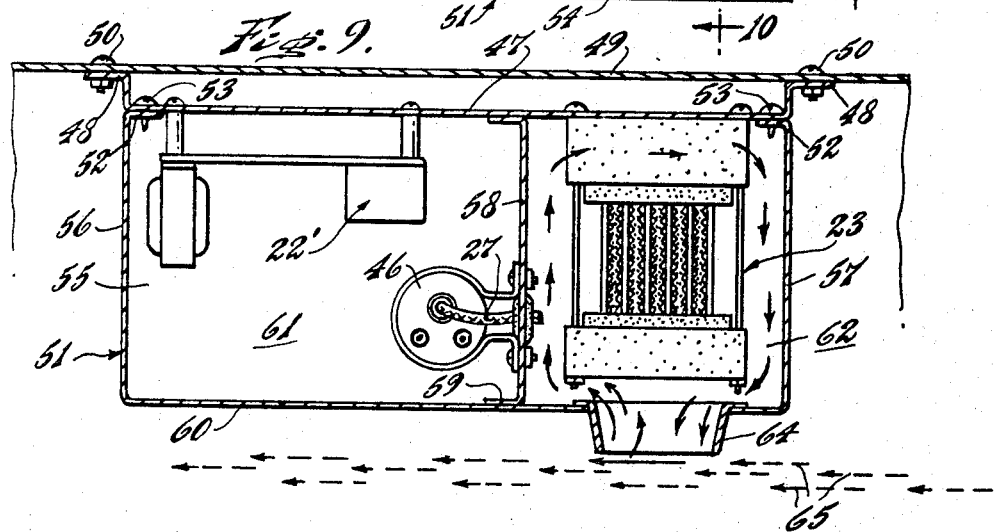
FIGURE 9 is a section on line 9—9 of FIGURE 8.
Figure 10:
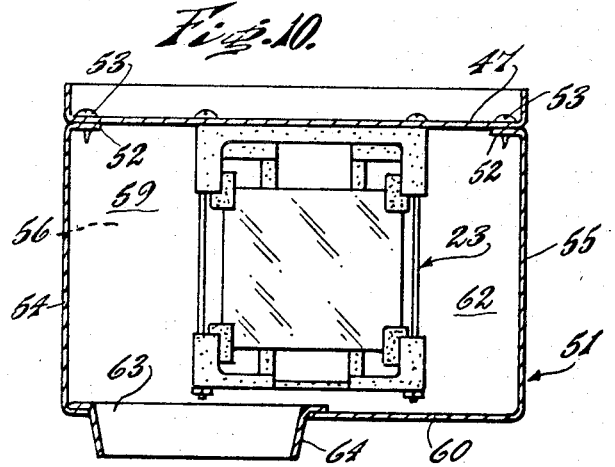
FIGURE 10 is a section on line 10—10 of FIGURE 8.

The ozone generator in the modified form of the invention shown in FIGURES 8, 9 and 10, together with the electric circuit, is identical to that already described, except that the source of power in this case would be from the battery of the truck in which it is designed to be installed instead of being a self-contained unit, and the unit is designed to be mounted on the ceiling of the confined space of the truck instead of being portable.

The device in this case consists of a support panel 47, in the form of a shelf, provided with mounting means 48, adapted to be mounted on the ceiling 49, of a vehicle to be treated and fixed thereon by fastening means 50. The shelf 47 is also adapted to receive a closure 51, having mounting flanges 52 and fixed to the shelf 47 by fastening means 53, and also having side walls 54 and 55, end walls 56 and 57 and an inner transverse wall 58 which is provided with a mounting flange 59, fixed to a bottom wall 60, in any desired manner, thus separating the space within the closure 51 into two separate compartments, 61 and 62. The bottom 60, adjacent the compartment 62, is provided with a rectangular opening 63 into which is mounted a venturi 64, fixed thereto in any desired manner, and the opening of which extend below the bottom 60 a sufficient distance to be acted upon by the passage of air, indicated by the horizontal arrows 65 below the opening of the venturi, said flow of air being produced in any conventional manner in the vehicle being treated.

The construction of the ozone generator and the chamber in which it is housed, is such as to allow for more rapid and efficient dissipation and circulation of the gases from the generator chamber into the air being circulated within the closed space of the vehicle being treated.

The principle involved in creating a flow from the generator is one of equalization of pressures and the elimination of a vacuum. The physical structure of the generator chamber with the tapered sides to the nozzle opening is such, that when a current of air passes across the nozzle opening, a reduction of pressure innside the nozzle results. A siphon action is thus accomplished which draws the gases from the generator chamber into the current of air passing across the nozzle opening. A vacuum is created causing the withdrawal of the gas. An eddy current is formed due to the frictional action of the air, thus permitting air to enter the chamber and a constant circulation inside the generator chamber results.

The currents of air across the nozzle opening causes the gases emanating from the chamber to be dissipated throughout the encompassing enclosure, whether it is a refrigerator, truck trailer body, box car, etc.

Penetration of gases throughout the surrounding chamber from the generator is further accomplished in accordance with the kinetic theory of gases.

It will be apparent from the foregoing description, that the present invention is designed to operate in a refrigerated cargo space for transportation of the ozonized cargo, with independent air circulating means in the cargo containing space.

Having thus described our invention, what we claim as new and desire to secure by Letters Patent is:

1. The method of ozonizing air circulating in a confined refrigerated space having independent means for air circulation, which consists in generating ozone in an ozone generator and then feeding the ozone into the circulating air by a venturi action, from a venturi, said venturi action being controlled by said circulating air passing across the discharge opening of said venturi, the inner wall of said venturi causing a reduction of pressure inside the venturi creating a siphon action and a vacuum, said siphon action and vacuum causing the withdrawal of the ozonized air within the generator chamber, the frictional action of said air creating an eddy current to permit air to enter said chamber and create a constant circulation of air within said generator chamber.

2. An ozonizing apparatus comprising a container located in a refrigerated space having its own air circulating means, said container having an ozonizing chamber, said chamber being provided with a venturi and a venturi passage which terminates exterior of said chamber and in communication with air in said refrigerated space, means to cause the air in said refrigerated space to circulate across the discharge end of said venturi passage, and means to generate ozone in said ozonizing chamber, the venturi action in said venturi being controlled by the circulating air passing across the discharge opening of said venturi, the inner wall of said venturi causing a reduction of pressure inside the venturi, creating a siphon action and a vacuum, said siphon action and vacuum causing the withdrawal of the ozonized air within the generator chamber, the frictional action of said air creating an eddy current to permit air to enter said chamber and create a constant circulation of air within said generator chamber.

References Cited

UNITED STATES PATENTS

| 1,001,038 | 8/1911 | Janich | 21—74 |
| 1,056,789 | 3/1913 | Held | 21—74 |
| 2,231,147 | 10/1943 | Smith | 62—264 |
| 3,309,304 | 3/1967 | Caplan | 204—313 |

MORRIS O. WOLK, *Primary Examiner.*

BARRY S. RICHMAN, *Assistant Examiner.*

U.S. Cl. X.R.

21—54, 55, 74, 102; 62—78, 264; 99—213, 228